April 15, 1952     E. ARON     2,592,845
CHASSIS SUPPORTING STRUCTURE FOR VEHICLE LIFTS
Filed Oct. 31, 1949     3 Sheets-Sheet 1
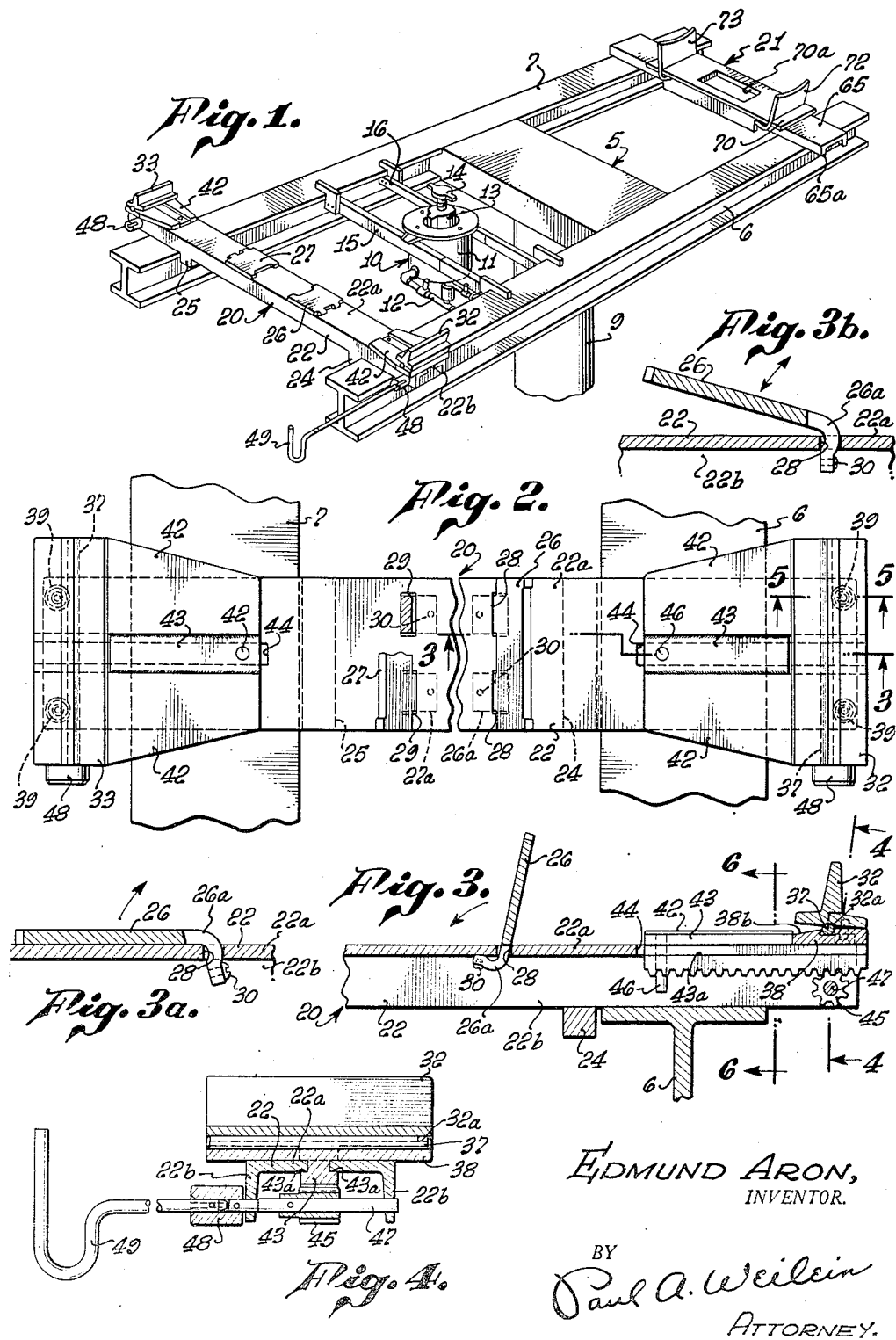
EDMUND ARON,
INVENTOR.
BY Paul A. Weilein
ATTORNEY.

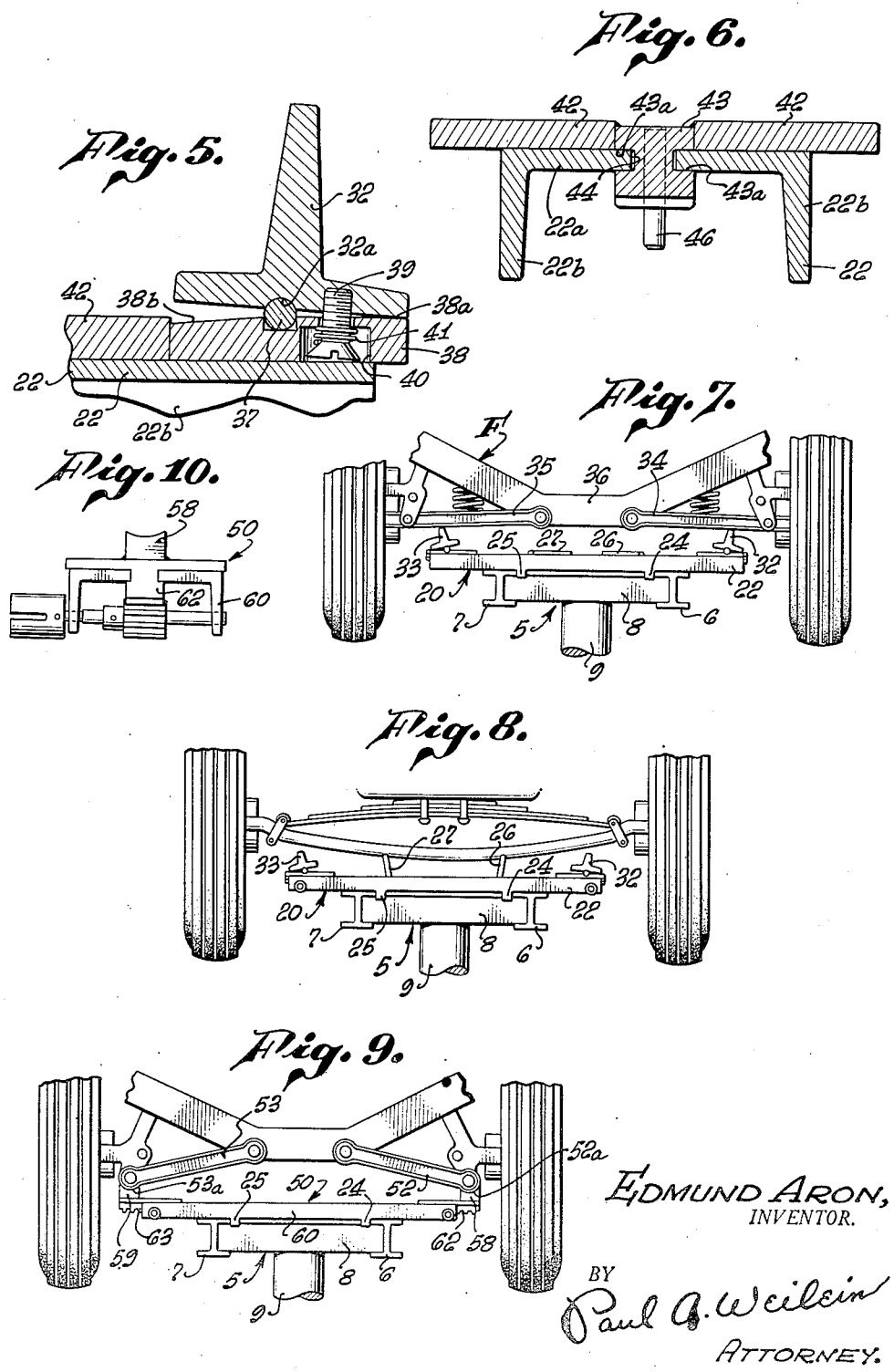

April 15, 1952      E. ARON      2,592,845
CHASSIS SUPPORTING STRUCTURE FOR VEHICLE LIFTS
Filed Oct. 31, 1949      3 Sheets-Sheet 3
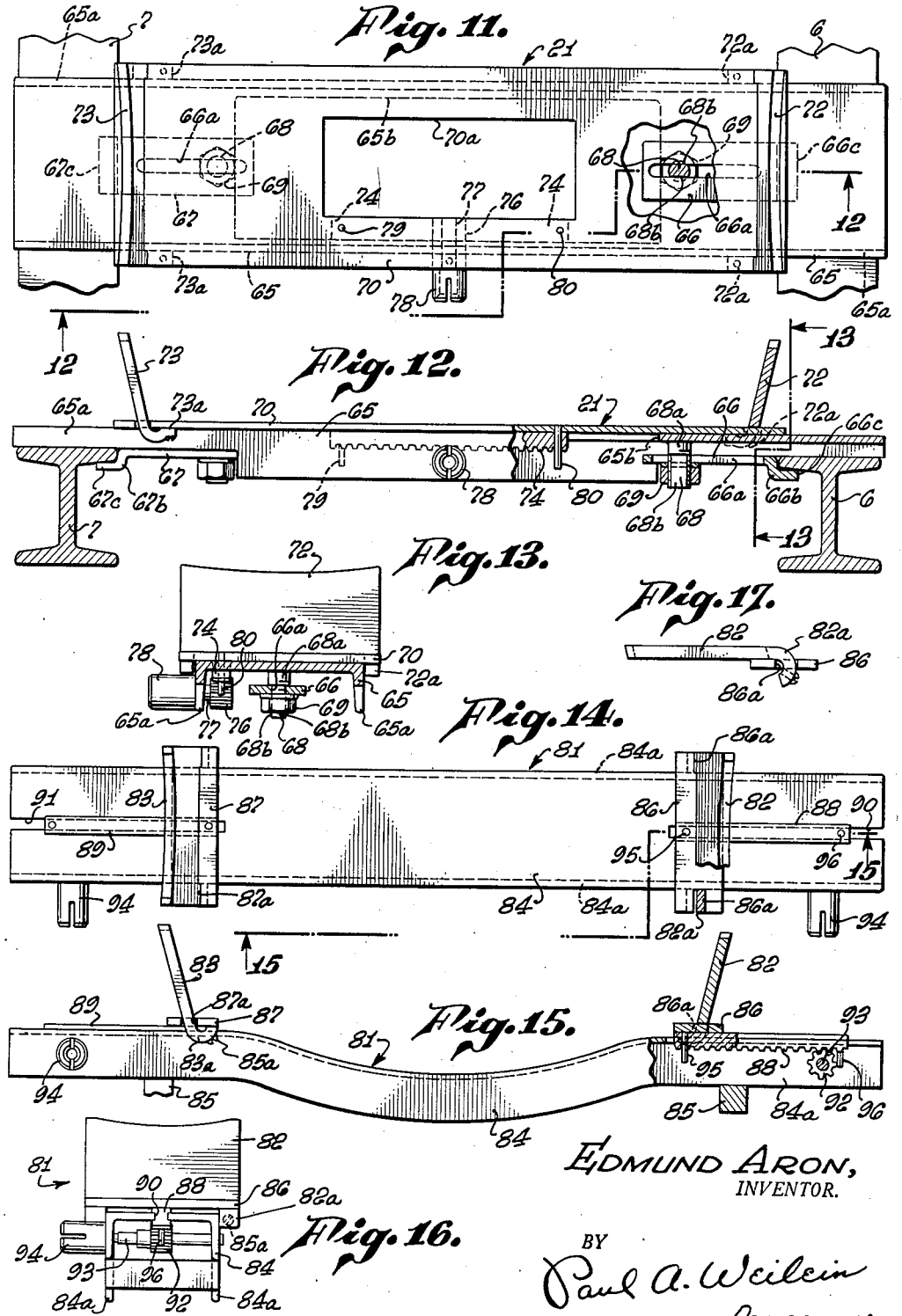

Patented Apr. 15, 1952

2,592,845

UNITED STATES PATENT OFFICE 2,592,845

CHASSIS SUPPORTING STRUCTURE FOR VEHICLE LIFTS

Edmund Aron, South Pasadena, Calif., assignor to Moto-Sway Corporation of America, South Pasadena, Calif., a corporation of California Application October 31, 1949, Serial No. 124,663

2 Claims. (Cl. 254—89)

This invention relates to vehicle lifting apparatus for use in connection with the lubrication of automotive vehicles; more particularly it relates to such apparatus of the "free wheel" type.

Vehicle lifts of the free wheel type are well known and generally comprise an elevatable frame having a pair of parallel supporting rails or members spaced apart by a distance substantially less than the tread of wheel gauge of standard vehicles and adapted to support the vehicle independently of the wheels by engaging the axles or other parts of the chassis.

It is an object of this invention to provide as an attachment for such lifts, improved means for engaging the vehicle chassis.

It is a matter of some difficulty to locate the vehicle transversely of the lift frame so that the parts of the chassis by which it is desired to support the vehicle are in position to be engaged by the respective supporting means on the lift. Accordingly, it is another object of this invention to provide support means which are readily adjustable transversely of the lift in accordance with the position of the chassis.

It is another object to provide in one form of this invention an attachment for vehicle lifts having a pair of transversely spaced chassis engaging members which are adjustable transversely of the lift frame in fixed spaced relation, and in another form wherein such members are independently transversely adjustable.

In present day vehicles, the portions of the rear axle which are available for engagement by the lift or supporting structure are restricted, due in part to shock absorbing connections therefor or other apparatus adjacent the outer ends of the housing. It is of course desirable that the points of support provided by the lift be as widely spaced as possible so that the supported vehicle will have proper stability. However, with conventional supports the previously mentioned difficulty of properly locating the vehicle on the lift often results in damage to the rear axle structure, shock absorbers thereon, and the like, when the vehicle is lifted. It is accordingly another object of this invention to provide a rear axle support means for use on a vehicle lift providing optimum stability to the vehicle when supported thereby and at the same time avoiding damage of the foregoing character. For this purpose a pair of axle engaging elements are provided in fixed spaced relation to engage the axle at the most widely spaced points possible, clear of the shock absorbers and/or other apparatus, and adjustable transversely of the lift to compensate for inaccurate positioning of the vehicle on the lift.

It is another object of this invention to provide novel means for supporting front end of a chassis having independently mounted or "knee action" front wheels.

It is known to provide vehicle lifts with mechanism for rocking the vehicle to facilitate the lubrication thereof. It is still another object of this invention to provide vehicle support means particularly adapted for use with vehicle lifts of this type.

This invention possesses many other advantages and has other objects which may be made more easily apparent from a consideration of several embodiments of the invention. For this purpose there are shown several forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

In the accompanying drawings:

Figure 1 is a perspective view showing a conventional free wheel vehicle lift with supporting structures for the front and rear portions respectively of a vehicle chassis, incorporating features of the invention mounted thereon;

Figure 2 is a plan view of the front support structure of Figure 1;

Figure 3 is a longitudinal section, partly in elevation, taken substantially as indicated by line 3—3 of Figure 2;

Figures 3-a and 3-b are detail views showing the manner of mounting the axle engaging elements of Figures 2 and 3;

Figure 4 is a transverse section, taken substantially as indicated by line 4—4 of Figure 3;

Figure 5 is a detail section, taken substantially as indicated by line 5—5 of Figure 2;

Figure 6 is a transverse section on an enlarged scale, taken substantially as indicated by line 6—6 of Figure 3;

Figure 7 is an end view showing the front end of a chassis supported by the structure of Figure 1;

Figure 8 is a similar view, showing an alternative manner of use;

Figure 9 is a similar view, but showing a modified form of support structure;

Figure 10 is an end view of the support member of Figure 9;

Figure 11 is a plan view of the rear support structure of Figure 1;

Figure 12 is a longitudinal section, partly in elevation, taken substantially as indicated by line 12—12 of Figure 11;

Figure 13 is a transverse section, taken substantially as indicated by line 13—13 of Figure 12;

Figure 14 is a plan view of a modified form of rear support structure;

Figure 15 is a longitudinal section, partly in elevation, taken substantially as indicated by line 15—15 of Figure 14;

Figure 16 is an end elevation, seen as looking from the right in Figure 15; and

Figure 17 is a detail view showing the mounting of one of the axle engaging elements of Figure 15.

Referring to Figure 1 of the drawings, a conventional vehicle lift is shown, having a frame 5 comprising a pair of spaced longitudinal supporting rails 6 and 7 connected by a cross member 8 mounted on the upper end of a plunger 9 for raising and lowering movement in a well understood manner. The lift is shown as having a fluid presure actuated device 10 for optional operation to sway, lift or otherwise move the frame of the vehicle with respect to its points of support on the lift. This device 10 comprises a cylinder 11, connected with a source of fluid pressure (not shown) by a valve controlled conduit 12, and having a plunger 13 projecting from its upper end, carrying the vehicle frame engaging bar 14. The cylinder 11 is supported for lateral as well as longitudinal adjustment with respect to the rails 6 and 7 by the aid cross members 15 and 16. A rocking or vibrating device of this type is disclosed and claimed in my Patent #2,250,321, granted July 22, 1941, and entitled "Vehicle Lifting and Vibrating Device."

The vehicle supporting structures, by the aid of which the vehicle is supported on the lift frame 5 at chosen points in the chassis, are generally indicated by the numerals 20 and 21 in Figure 1, the structure 20 being for the front of the vehicle, the structure 21 being for the rear.

The front supporting structure 20 comprises a member 22 extending transversely of the frame 5 and overlying the rails 6 and 7 so as to be supported thereon. The member 22 may conveniently be of channel shaped cross section with the web 22-a horizontally supported above the rails 6 and 7 by the depending flanges 22-b. A pair of appropriately spaced lugs 24 and 25 secured to flanges 22-b serve as guides to properly locate the structure 20 transversely on the frame 5.

This structure 20 is optionally adaptable for use with a vehicle having a front axle or with one having independently mounted or knee action front wheels. Thus, as shown in Figures 1, 2, 3 and 6, a pair of plates 26 and 27 are hingedly mounted on the member 22 for optional movement into an upright axle engaging position (Figure 3) or to a prone position on the member 22 (Figure 3-a). For this purpose, the web 22-a of the member 22 is provided with pairs of aligned slots 28 and 29 through which curved extensions or tongues 26-a and 27-a of the supports 26 and 27 extend respectively.

As clearly shown in Figure 3, the length and curvature of the tongue 26-a is such that the end of the tongue by engagement with the underside of the web 22-a serves as a limit to movement in one direction to maintain the plate 26 in an over center load supporting position.

Further, the tongues 26-a also serve as hinges, allowing movement of the plate 26 to inactive, prone position. The tongues 26-a are so shaped, that by inclining the plate 26 at a small angle to the web 22-a, the tongues will readily pass through the slots 28, upon movement of plate 26 in a vertical direction. Thus, the plate 26 may be readily mounted on the member 22 or removed therefrom, and is retained against accidental removal by means of screws 30 inserted in the tonges 26-a after mounting, the heads of the screws 30 by engaging the edge of the slot 28 preventing movement of the tongues 26-a through the slot 28. The tongues 27-a are substantially identical with tongue 26-a.

For supporting the front end of a chassis having knee action wheels, members 32 and 33 of inverted T-section are provided on the member 22 for engaging the under side respectively of the wheel attachment arms 34 and 35 which are pivotally mounted at their inner ends to a cross member 36 of the vehicle frame F (see Figure 7).

Since the members 32 and 33 and their manner of mounting are identical, a description of one will suffice. Thus, the member 32 extends across the end of the member 22 and is mounted for rocking movement thereon by means of a short shaft or rod 37 engaging a recess 32-a in the member 32 and secured to a plate 38 extending across the end of the member 22 and supported thereon. The upper face of the plate 38 has a pair of angularly disposed portions 38-a and 38-b serving by engagement respectively with the bottom of the member 32 to limit its rocking movement. A pair of screws 39, 39 project downwardly from the member 32 through suitable apertures in the plate 38, the screw heads being accommodated in counter bores 40 and confining compression springs 41 against the upper ends thereof, so that the member 32 is biased to an outwardly inclined position (Figures 3, 5 and 7).

Brief consideration will show that when the vehicle is supported by the aid of the arms 34 and 35, rocking movement will cause the arms to move about their pivots, causing a change in the horizontal length of the arms. Thus, when a vehicle with its front end supported by the engagement of arms 34 and 35 with members 32 and 38 is rocked, as by the previously discussed rocking or vibrating device 10, or otherwise, the variation in the length of the arms is accommodated by the tilting of the members 32 and 33. In this way, any sliding movement between heavily loaded parts is avoided and freedom of motion is assured.

The members 32 and 33 are adjustable longitudinally of the member 22 and transversely of the vehicle. Thus, the plate 38 is slidable on the upper surface of the member 22 and is connected by wing plates 42 to the opposite sides of a rack member 43 which is slidably accommodated in an open ended slot 44 in the web 22-a of the member 22. Thus, the weight of the vehicle acting on the member 32 is transferred by pin 37 to plate 38 and thence to the connected plate 42, the plates 38 and 42 being supported on the member 22. As clearly shown in Figure 6, the rack member 43 has a pair of oppositely disposed grooves 43-a which by engagement with the opposite edges of the slot 44 serve to support and guide the rack 43. As shown in Figures 3 and 4, the forward portion of the rack 43 above the grooves 43-a is cut away to accommodate the plate 38. The parts may be secured in appropriate assembled relation by welding.

A pinion 45 engages the rack 43 for moving the rack and connected parts including the member 32, the inner end of the slot 44 serving by engagement with the rack 43 to limit inward movement thereof, a pin 46 depending from the rack serving by engagement with the pinion 45 to limit outward movement of the rack.

The pinion 45 is fixed on a shaft 47 rotatably supported by the flanges 22–b and having a socket 48 for detachable connection with an operating handle or crank 49 to enable rotation of the pinion 45 and adjustment of the member 32. The other rockable support member 33 is arranged in a substantially identical manner.

A modified form of front supporting structure 50, shown in Figures 9 and 10, is also for use with vehicles having "knee action" front wheels, but of a different type wherein it is not necessary to accommodate horizontal movement of the wheel attachment arms 52 and 53. Accordingly, means 58 and 59 are provided on the structure 50 having concave upper surfaces for engaging and supporting the arm outer ends 52–a and 53–a. The supporting means 58 and 59 are slidably supported on the upper surface of a channel shaped transverse member 60 as before, being connected for movement respectively with racks 62 and 63, which are guided and arranged for movement as in the first described form of the invention.

The supporting structure 21 for the rear of the vehicle will now be described. As shown in Figures 11, 12 and 13, this structure comprises a channel shaped member 65 adapted to extend transversely of the vehicle lift frame 5, with the end portion of its flanges 65–a of reduced height overlying and supported on the rails 6 and 7 respectively. A pair of clips 66 and 67 are provided adjacent the opposite ends of the member 65 respectively for locating the member 65 transversely on the frame 5 by engaging the rails 6 and 7 thereof. The clips 66 and 67 are secured to the member 65 for longitudinal adjustment thereon, that is transversely of the frame 5. For this purpose, a depending stud 68 of special form is secured to the member 65, having a cylindrical base portion 68–a of substantially the same height as the reduced flange portions and flat sides 68–b therebelow directed longitudinally of the member 65. The clip 66 has a slot 66–a engaging said sides 68–b, so that the clip 66 is constrained to move longitudinally of the member 65, being secured in adjusted position by the aid of a nut 69 on the stud 68. The clip 67 is adjustably secured in the same manner.

The outer ends of the clips 66 and 67 respectively have downward offsets 66–b and 67–b which, by engagement respectively with the top flanges of the rails 6 and 7, position the member 65 transversely of the frame 5, the spacing of the clips 66 and 67 being adjusted in accordance with the distance between the rails. The offsets 66–b and 67–b have horizontal extensions 66–c and 67–c respectively engageable with the top flange of the rails 6 and 7. Sufficient clearance is provided to allow free sliding movement of the member 65 along the rails 6 and 7, but upward movement of the member 65 is restrained.

A plate 70 is slidably supported on the top surface of the member 65 and overhangs the opposite edges thereof. Plate 70 has a pair of vehicle support means or plates 72 and 73 quite similar to the previously described plates 26 and 27 and hingedly mounted in the same manner. However, in the present instance, the curved extensions or tongues 72–a and 73–a are accommodated in short slots or openings in the opposite overhanging edges of the plate 70. To accommodate the differential housing of an axle supported by the structure 21, the central portion of the plate 70 and of the web of the channel 65 may be cut out as indicated at 70–a and 65–b.

The support means 72 and 73 are in fixed spaced relation with respect to each other, but together are adjustable longitudinally of the member 65. For this purpose, a rack 74 is secured on the plate 70, projecting downwardly through an opening in the web of member 65 and engaging a pinion 76 rotatably mounted in one of the flanges 65–a of the member 65 by the aid of a short shaft 77 having a socket 78 for detachably accommodating the operating handle or crank 49. Spaced stop pins 79 and 80 are provided for appropriately limiting travel of the rack 74 and plate 70 by respectively contacting the pinion 76.

A modified form of rear support structure 81 is shown in Figures 14, 15 and 16. In this form, the inclined support plates 82 and 83 are mounted for independent movement on a transverse member 84 by the aid of short plates 86 and 87 connected respectively to racks 88 and 89 guided in slots 90 and 91 in the end portions of the member 84 for operation by pinions, one of which is shown at 92. As in the previous forms of support structures, the member 84 is of channel shaped cross section and is adapted to overlie the longitudinal rails of a vehicle lift (not shown), being supported by the engagement of the flanges 84–a therewith. Means, such as bars 85 secured to member 84 in appropriately spaced relation are provided for locating the structure 81 transversely on the frame.

The plates 86 and 87 overhang the opposite edges of the member 84, the overhanging portions being provided with slots 86–a and 87–a for accommodating the tongues 82–a and 83–a of the plates 82 and 83 respectively.

The tongues 82–a and 83–a are of slightly different form from those previously discussed, but serve in a similar manner to mount the supports 82 and 83 on the plates 86 and 87 respectively for movement between an inclined vehicle supporting position and a prone or inactive position. In said inclined position, the supports 82 and 83 rest respectively on the plates 86 and 87, with the ends of the tongues 82–a and 83–a engaging the bottoms of the plates 86 and 87 and cooperating to carry the load. The parts are so proportioned that in the prone position, the tongue 82–a (Figure 17) will pass vertically through the slot 86–a to permit removal or installation of the plate 82. Accidental removal of the plate 82 is prevented by means of a screw 85–a threaded into the tongue 82–a after installation, the head of the screw 85–a by engaging the edge of the slot 86–a restricting upward movement of the tongue 82–a. The tongues 83–a and slots 87–a are arranged in the same manner.

The pinion 92 is fixed in a shaft 93 extending between the flanges 84–a and rotatably supported thereby, a socket 94 being provided at its outer end for an operating handle. Spaced pins 95 and 96 are provided on the rack 88 for limiting movement thereof and the associated plate 82 by respectively contacting the pinion 92. The mid-portion of the member 84 is shown as curved downwardly to accommodate the differential housing of a rear axle when mounted on the structure. By having the supporting plates 82 and 83 independently adjustable, engagement of the desired area on the axle by the plates is facilitated.

I claim:

1. In a vehicle support structure for use with a vehicle lift having a pair of longitudinal support rails: a transverse member adapted to overlie said rails and be supported thereon, and having an upwardly facing surface; a pair of elements slidably mounted on said surface respectively adjacent the opposite ends thereof; means guiding said elements for movement in a direction transverse to said rails; means for moving said elements; and a chassis engaging member pivotally mounted on each element for limited movement about a longitudinal axis.

2. In a vehicle support structure for use with a vehicle lift having a pair of longitudinal support rails: a transverse member adapted to overlie said rails and be supported thereon, and having an upwardly facing surface; a pair of elements slidably mounted on said surface respectively adjacent the opposite ends thereof; means guiding said elements for movement in a direction transverse to said rails; means for moving said elements; means forming a pivot having a longitudinal axis on each of said elements; and a chassis engaging member mounted on each of said pivots, and having surfaces on opposite sides thereof adapted to respectively engage said element to limit angular movement of said chassis engaging member about said pivot, said member being resiliently biased to one limit of its movement.

EDMUND ARON.

REFERENCES CITED

The following references are of record in the file of this patent:

UNITED STATES PATENTS

| Number | Name | Date |
|---|---|---|
| 2,091,067 | Engh | Aug. 24, 1937 |
| 2,229,113 | Mizer | Jan. 21, 1941 |
| 2,540,428 | Cochin | Feb. 6, 1951 |
| 2,543,260 | Teegarden | Feb. 27, 1951 |

FOREIGN PATENTS

| Number | Country | Date |
|---|---|---|
| 102,479 | Australia | Nov. 10, 1937 |
| 347,602 | Great Britain | Apr. 28, 1931 |